March 13, 1962 K. H. JAENSCH 3,024,906

AUTOMATIC DIGITAL SORTING SYSTEM

Filed Oct. 5, 1959 2 Sheets-Sheet 1

INVENTOR.
KLAUS H. JAENSCH

BY Robert Nathans

ATTORNEY

March 13, 1962 K. H. JAENSCH 3,024,906

AUTOMATIC DIGITAL SORTING SYSTEM

Filed Oct. 5, 1959 2 Sheets-Sheet 2

3,024,906

AUTOMATIC DIGITAL SORTING SYSTEM

Klaus H. Jaensch, Rochester, N.Y., assignor to General Dynamics Corporation, Rochester, N.Y., a corporation of Delaware Filed Oct. 5, 1959, Ser. No. 844,304
3 Claims. (Cl. 209—81)

The present invention relates to automatic digital sorting systems.

The value of individual reactive components is often determined by manually inserting the component into a bridge circuit and measuring the degree of unbalance of the bridge. This method, along with most other methods presently employed, is tedious, time consuming and not suitable for mass production techniques.

It is a principal object of the present invention to provide a new and improved automatic digital sorting system.

It is a further object of the present invention to provide an improved automatic digital sorting system which carries out a sorting operation only if a variable characteristic of the component tested by the system is determined to be within an acceptable tolerance range.

It is a further object of the present invention to provide an automatic digital sorting system which rejects a component passing through the system, or accepts the component and causes it to be deposited into one of a plurality of classification bins, depending upon the results of a test performed on the component.

It is a feature of the present invention to provide means for producing a digital output having at least two orders indicative of the results of a test performed on each component passing through the system, and means for causing each component to be accepted or rejected depending upon the value of that portion of the digital output having the more significant order and for causing an accepted component to be sorted into one of a plurality of classification bins depending upon the value of that portion of the digital output having the less significant order.

Further objects, features and advantages of the present invention will become apparent as the following description proceeds and the features of novelty which characterize the invention will be pointed out with particularity in the claims annexed to and forming a part of this specification.

Figure 1:
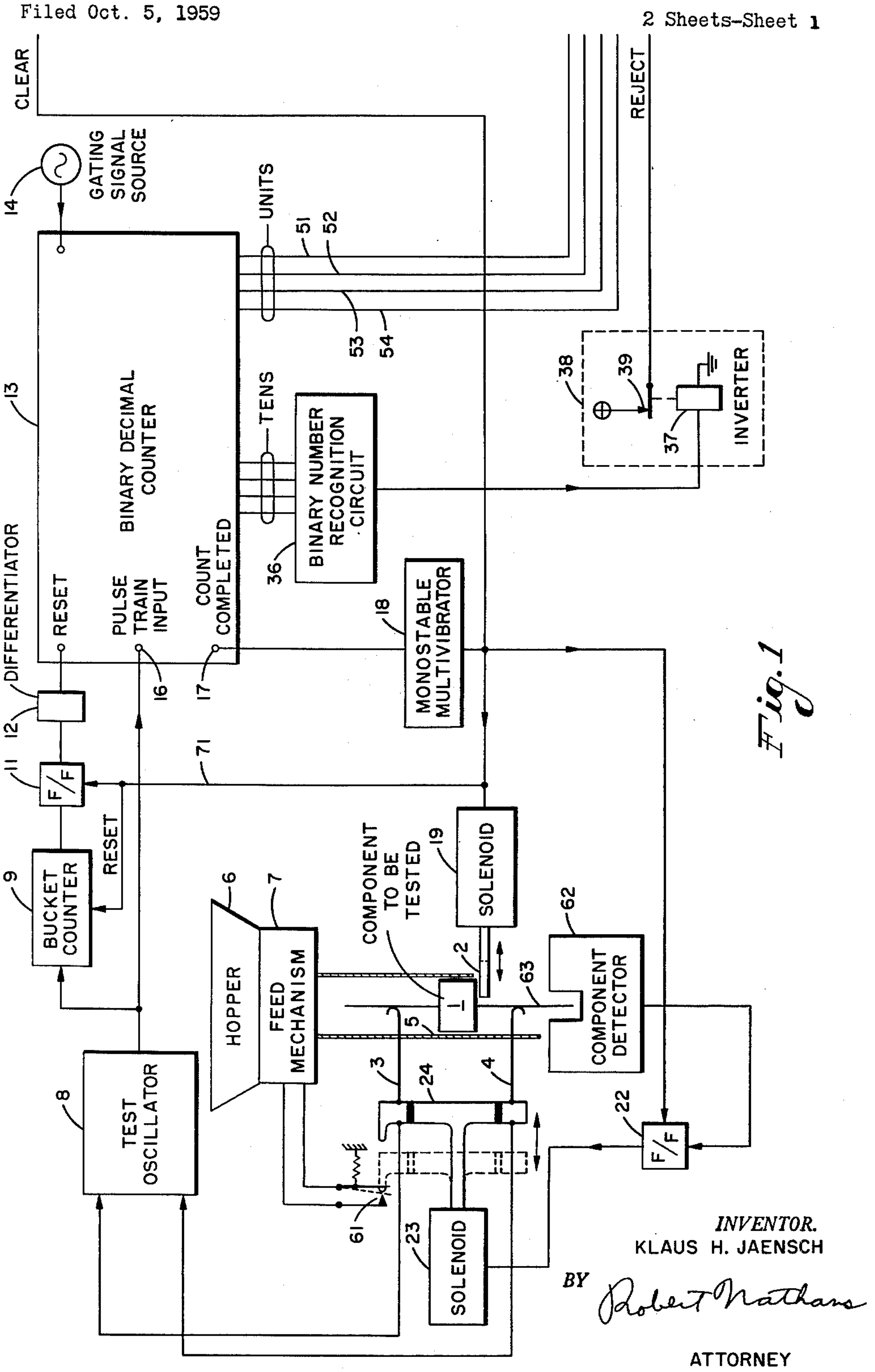
Figure 2:
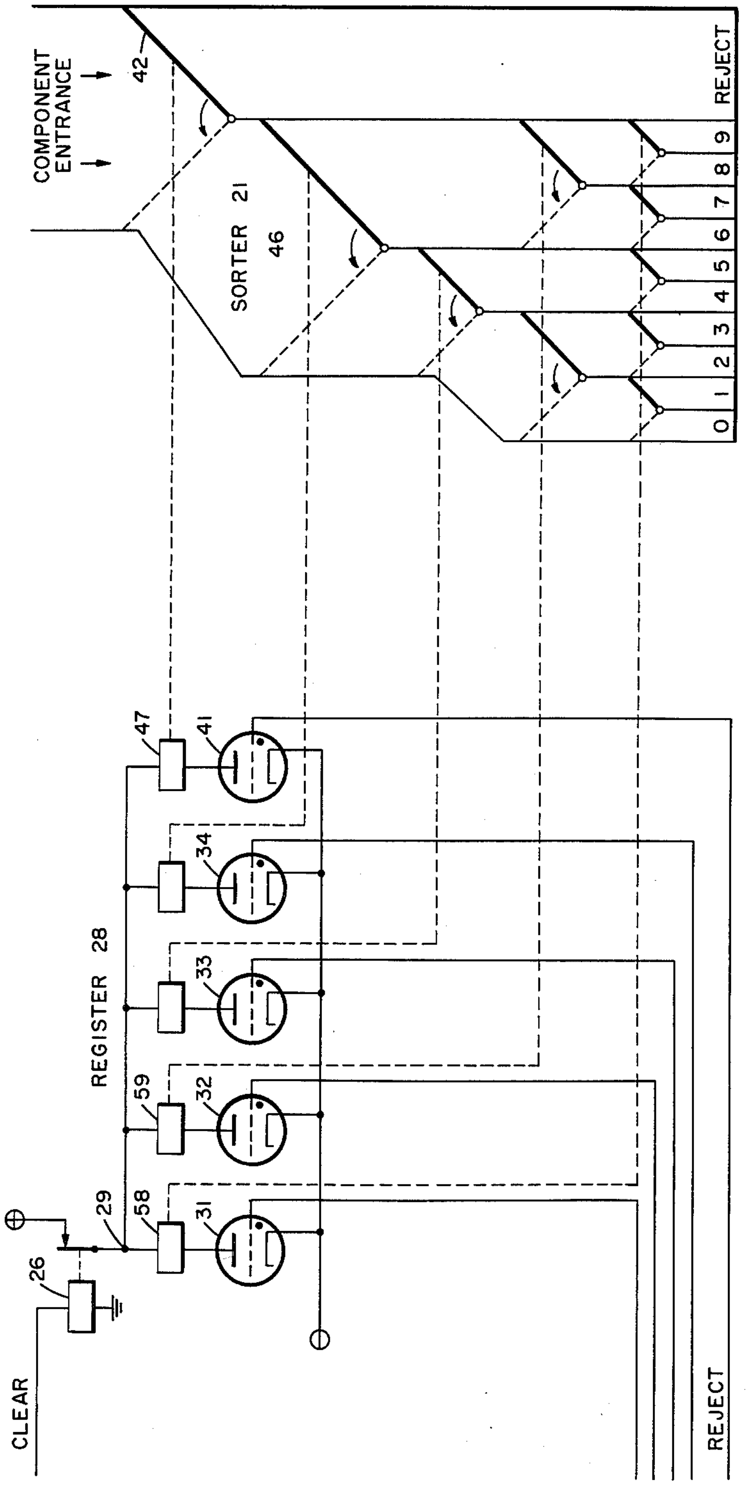

For a better understanding of the invention, reference may be had to the accompanying drawings of which:

FIGS. 1 and 2 disclose a preferred embodiment of the invention.

Referring now to FIG. 1 of the drawings, a component to be tested 1 is disclosed supported by slideable latch 2 and chute 5. Component 1 is transmitted from hopper 6 into the position shown by feed mechanism 7 which may be of any standard type. Component 1 may be an inductor or a capacitor in the particular embodiment disclosed. The cycle commences with the component in the position shown, and with probes 3 and 4 making contact with the leads of the component. The resonant tank circuit of the test oscillator 8 is completed when probes 3 and 4 make contact with the component to be tested. If component 1 is a capacitor, oscillator 8 is arranged so that an inductor is already in circuit with the remainder of the oscillator and that therefore the component 1 completes the tank circuit. Test oscillator 8 is of a type which oscillates only upon the completion of its resonant tank circuit in the manner disclosed above. At the end of a fixed interval after test oscillator 8 commences to oscillate, bucket counter 9 causes flip-flop 11 to change its state which in turn causes a pulse produced by differentiator 12 to reset binary decimal counter 13, thereby clearing the binary counter chain within the counter. The binary decimal counter is of a standard type, such as models 7360 and 7350 manufactured by the Berkley Division of Beckman Instruments, Inc. of Richmond, California. This counter is basically a binary counting chain having an input gate which is opened for a fixed interval to admit a train of pulses into the counter. The counter produces a binary decimal output as disclosed in FIG. 1. A gating signal is applied to the counter by source 14 which may be an ordinary 60 cycle A.C. wave. The function of source 14 is to control the gate which transmits the pulse train applied at input terminal 16, to the binary counter chain contained within the counter. The gate may be opened for one-half of the period of the wave produced by source 14, or for N cycles, as desired.

Upon the expiration of a fixed interval after oscillator 8 commences to oscillate, counter 13 is reset and the pulse train generated by oscillator 8 is introduced into the binary counting chain as soon as the gate contained within counter 13 is opened by the signal produced by source 14. The gate remains open for a fixed interval, and as a result the binary output of the counter will be proportional to the frequency of the pulse train produced by oscillator 8. Because the capacitance or inductance, as the case may be, of the component being tested directly affects the frequency of oscillator 8, the binary decimal output of counter 13 will be proportional to the capacitance or inductance of the component tested. When the count is completed, the counter produces a pulse on terminal 17 which causes monostable multivibrator 18 to change its state for a fixed interval. This action causes solenoid 19 to become energized which in turn causes latch 2 to be moved to the right. The actuation of monostable multivibrator 18 also causes flip-flop 22 to change its state thereby to cause solenoid 23 to become energized. The energization of solenoid 23 causes the probe supporting member 24 to be retracted to the position represented by the dotted outline disclosed in FIG. 1 to turn oscillator 8 off. Upon the retraction of member 24, the component just tested falls into sorter 21, disclosed in FIG. 2. The actuation of monostable multivibrator 18 also causes register clearing relay 26, disclosed in FIG. 2, to become energized for a short period, until monostable multivibrator 18 reverts back to its former state. The energization of relay 26 breaks the thyratron plate circuits, which action clears register 28. The thyratron plate circuits are again completed upon the reversion of monostable multivibrator 18 back to its original state, thereby to re-enable register 28. Solenoid 19 is deenergized simultaneously with the deenergization of relay 26 and as a result latch 2 slides to the left. The function of register 28 is to control sorter 21 according to the binary decimal output signals impressed upon the output leads of counter 13 when the contacts of relay 26 have been reclosed, that is, when the completed count is stored in the counter.

Let us assume that the results of the test performed on the components passing through the system must be represented by a binary output which lies between 79 and 90. Therefore, it is necessary to reject any component producing the count of 79 or less, or 90 or more, and accept any component producing a count lying in the eighties. In addition, any component producing an acceptable count must be sorted into one of ten bins disclosed in FIG. 2. If the binary number standing on the tens leads is an eight, binary number recognition circuit 36 produces a D.C. output signal which in turn causes relay 37 of inverter 38 to become actuated and remain actuated until the counter is reset. If the binary number standing on the tens output leads of counter 13 is other than eight, relay 37 is not actuated. Recognition circuit 36 forms no part of the present invention and may be any of the types well known in the art. Actuation of relay 37 causes contacts 39 to become separated thereby to prevent the triggering of thyratron 41, disclosed in FIG. 2. Since the state of thyratron 41 controls the position of flap 42 of sorter 21 by means of solenoid 47, it follows that the component being tested will be rejected if the binary number on the tens output leads of counter 13 should be other than eight.

The states of thyratrons 31–34 are controlled by the binary number standing on the units output leads of counter 13. Since the units leads control the states of thyratrons 31–34, and since the states of these thyratrons in turn control the position of the remaining flaps of sorter 21, it should be apparent that any component which is not rejected and which enters chamber 46 of sorter 21 will be sorted into one of the bins of sorter 21 depending upon the binary number standing on the units output leads of counter 13.

Let us assume that the result of the test is eight-three. Thyratron 41 is not conducting because contacts 39 are opened by the energization of relay 37 and as a result, flap 42 maintains the position disclosed in FIG. 2 and prevents the component from entering the reject bin. Because the binary output of counter 13 is represented by the so-called "4–2–2–1" code, leads 51 and 52 will be marked and leads 53 and 54 will be unmarked. The marking of lead 51 causes thyratron 31 to fire and the marking of lead 52 causes thyratron 32 to fire. As a result, solenoids 58 and 59 operate to cause the flaps associated with the two lowest levels of flaps within sorter 21 to become actuated to assume the positions represented by the dotted lines disclosed in FIG. 2. The three remaining upper flaps remain in the positions represented by the solid lines and as a result, the component falls into the bin labeled 3 in FIG. 2. It should be obvious that sorter 21 may be designed to accommodate any particular binary code produced by the counting chain and the invention is in no way limited to the specfic configuration disclosed. After the register becomes enabled once more due to the deenergization of relay 26, the flaps, excluding flap 42, are positioned according to the units digit stored in the register. This positioning process is completed before the component enters the sorter since it takes considerable time for the component to slide down the connecting chute.

When the movable probe support 24 assumes the position represented by the dotted lines of FIG. 1, contacts 61 are closed and feed mechanism 7 becomes actuated thereby to allow the next component to slide down chute 5. When the component falls into place, a signal is produced by component detector 62 which in turn causes flip-flop 22 to change its state thereby to deenergize solenoid 23 and cause probes 3 and 4 to make contact wtih the leads of the component to be tested. Component detector 62 may be a simple mechanical switch or an oscillator which commences to oscillate upon the approach of lead 63 of the component to be tested. When the count was completed in the prior test, flip-flop 11 and bucket counter 9 were reset over lead 71. This action prepares the bucket counter and flip-flop for subsequent operation. Upon the change of state of flip-flop 22 due to the signal produced by detector 62, solenoid 23 becomes deenergized so that probes 3 and 4 make contact with the new component to be tested. Test oscillator 8, whose operation was halted when probes 3 and 4 were removed from the prior component tested, again commences to oscillate when probes 3 and 4 make contact with the new component to be tested, and the cycle repeats itself.

Although the system disclosed in FIGS. 1 and 2 is designed for sorting capacitors and inductors, it should be understood that the invention is not limited to the sorting of these components. It should be understood that resistors may also be sorted by the present invention by substituting a standard digital voltmeter for the binary decimal counter 13. A standard resistor would be connected in series with the resistor to be sorted and a standard battery would be connected across the series circuit. The input circuit of the digital voltmeter would be connected across the resistor to be sorted. These digital voltmeters produce binary outputs which may be utilized to control the flaps of sorter 21 in a manner similar to that described hereinabove. By the use of such a digital voltmeter, many other types of objects may be sorted. For example, if it is desired to sort non-opaque objects according to their thickness, any photocell arrangement well known in the art may be positioned to produce a voltage proportional to the thickness of the object. This voltage would in turn be digitalized by the binary decimal voltmeter to control the sorting operation.

It may be desirable to match capacitors with inductors to fabricate a tank circuit having a fixed resonant frequency. It should be obvious that the test oscillator may be modified so that the capacitor and inductor to be matched both make up the tank circuit of test oscillator 8. With such an arrangement, both the capacitor and the inductor would pass through sorter 21 if the more significant digit produced by the digital voltmeter prevents rejection of the pair.

While there has been disclosed what is at present considered to be the preferred embodiment of the invention, other modifications will readily occur to those skilled in the art. It is not therefore desired that the invention be limited to the specific arrangement shown and described and it is intended in the appended claims to cover all such modifications as fall within the true spirit and scope of the invention.

What is claimed is:

1. An automatic digital sorting system comprising, component inspecting means for producing a digital output indicative of the results of a test performed on a component, means for representing said digital output in at least two significant orders, first directing means, means for transmitting said component to said first directing means after being tested, means coupled to said means for representing for causing said first directing means to direct said componet into a sorting area or into a rejection area depending upon the value of the more significant digit, and second directing means coupled to said means for representing for directing said component into one of a plurality of classifying areas if it first reaches said sorting area depending upon the value of the less significant digit.

2. An automatic digital sorting system comprising, component inspecting means, means responsive to the operation of said component inspecting means for generating a train of pulses having a frequency proportional to the tested variable, means coupled to the output circuit of said means for generating for producing a digital output indicative of the frequency of said pulse train, means for representing said digital output in at least two significant orders, first directing means, means for transmitting each component to said first directing means after being tested, means coupled to said means for representing for causing said first directing means to direct said component into a sorting area or into a rejecting area depending upon the value of the more significant digit, and second directing means coupled to said means for representing for directing said component into one of a plurality of classifying areas if it first reaches said sorting area depending upon the value of the less significant digit.

3. An automatic digital sorting system comprising, an orifice for receiving items to be sorted, N bistable devices, a plurality of classification areas communicating with said orifices, means responsive to the states of said bistable devices for causing an item introduced into said orifice to be fed into one of said classification areas, means for producing a digital output to signify the results of a test performed on an item, means for coupling the output circuit of said means for producing to the control circuits of said bistable devices, means for producing a clearing signal when the information stored by said means for producing ceases to change thereby indicating the completion of a test, means responsive to said clearing signal for causing said bistable devices to assume a first state thereby to erase previously stored information and to cause said devices to thereafter become enabled so that they may store fresh digital information received from said means for producing, which is representative of a newly performed test.

References Cited in the file of this patent

UNITED STATES PATENTS 2,617,526 La Pointe ------------- Nov. 11, 1952

UNITED STATES PATENT OFFICE

CERTIFICATE OF CORRECTION

Patent No. 3,024,906 March 13, 1962

Klaus H. Jaensch

It is hereby certified that error appears in the above numbered patent requiring correction and that the said Letters Patent should read as corrected below.

Column 4, line 62, for "rejecting" read -- rejection --; line 71, for "orifices" read -- orifice --.

Signed and sealed this 11th day of September 1962.

(SEAL)
Attest:

ERNEST W. SWIDER
Attesting Officer

DAVID L. LADD
Commissioner of Patents